United States Patent
Woergoetter

(10) Patent No.: US 10,081,916 B2
(45) Date of Patent: Sep. 25, 2018

(54) METHOD FOR CONTROLLING THE BALLAST SUPPLY DURING RENOVATION OF A BALLAST BED

(71) Applicant: Plasser & Theurer Export von Bahnbaumaschinen Gesellschaft m.b.H., Vienna (AT)

(72) Inventor: Herbert Woergoetter, Gallneukirchen (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 76 days.

(21) Appl. No.: 15/116,317

(22) PCT Filed: Feb. 24, 2015

(86) PCT No.: PCT/EP2015/000418
§ 371 (c)(1),
(2) Date: Aug. 3, 2016

(87) PCT Pub. No.: WO2015/144280
PCT Pub. Date: Oct. 1, 2015

(65) Prior Publication Data
US 2017/0009403 A1    Jan. 12, 2017

(30) Foreign Application Priority Data
Mar. 25, 2014    (AT) .................................. A 211/2014

(51) Int. Cl.
*E01B 27/00*    (2006.01)
*E01B 27/02*    (2006.01)
(Continued)

(52) U.S. Cl.
CPC ............ *E01B 27/022* (2013.01); *B65G 67/10* (2013.01); *B65G 67/24* (2013.01); *E01B 27/00* (2013.01); *E01B 27/04* (2013.01)

(58) Field of Classification Search
CPC ......... E01B 27/00; E01B 27/04; E01B 27/022
See application file for complete search history.

(56) References Cited

U.S. PATENT DOCUMENTS 3,685,589 A * 8/1972 Plasser .................. E01B 27/105
                                                      171/16
3,842,994 A * 10/1974 Theurer .................... B61D 7/32
                                                      198/352

(Continued)

FOREIGN PATENT DOCUMENTS

AT    359 113 B    10/1980
AT    006 219 U2    6/2003
(Continued)

OTHER PUBLICATIONS

International Search Report of PCT/EP2015/000418, dated May 6, 2015.

*Primary Examiner* — Jason C Smith
(74) *Attorney, Agent, or Firm* — Collard & Roe, P.C.

(57) ABSTRACT

In the course of rehabilitation of a ballast bed of a track, while creating a track construction site (10), old bulk material (6) to be removed is stored on a plurality of storage wagons (2) connected to form a loading train (7). Parallel thereto, new bulk material (9) pre-deposited on a plurality of storage wagons (2) connected to form a loading train (8) is introduced into the track construction site (10). The introduction of the new bulk material (9) into the track construction site (10) is controlled automatically in dependence on a volume of the old bulk material (6) removed from the track construction site (10).

2 Claims, 1 Drawing Sheet

(51) Int. Cl.
*B65G 67/10* (2006.01)
*B65G 67/24* (2006.01)
*E01B 27/04* (2006.01)

(56) References Cited

U.S. PATENT DOCUMENTS

| | | | | |
|---|---|---|---|---|
| 3,976,142 | A * | 8/1976 | Plasser | E01B 27/028 |
| | | | | 104/2 |
| 4,108,076 | A * | 8/1978 | Knape | E01B 27/06 |
| | | | | 104/2 |
| 4,263,851 | A | 4/1981 | Theurer et al. | |
| 4,267,777 | A * | 5/1981 | Theurer | E01B 27/105 |
| | | | | 104/7.1 |
| 4,355,687 | A * | 10/1982 | Theurer | E01B 27/02 |
| | | | | 104/7.3 |
| 4,432,284 | A * | 2/1984 | Theurer | E01B 27/06 |
| | | | | 104/2 |
| 4,538,686 | A * | 9/1985 | Theurer | E01B 27/105 |
| | | | | 171/16 |
| 4,635,664 | A * | 1/1987 | Theurer | E01B 27/10 |
| | | | | 134/127 |
| 4,640,364 | A * | 2/1987 | Theurer | E01B 27/105 |
| | | | | 104/7.1 |
| 4,682,428 | A * | 7/1987 | Cicin-Sain | E01B 27/105 |
| | | | | 104/7.1 |
| 5,151,002 | A * | 9/1992 | Theurer | E01B 27/02 |
| | | | | 414/339 |
| 5,479,725 | A * | 1/1996 | Theurer | E01B 27/105 |
| | | | | 104/12 |
| RE35,788 | E * | 5/1998 | Theurer | E01B 27/105 |
| | | | | 104/12 |
| 5,944,469 | A * | 8/1999 | Theurer | E01B 27/00 |
| | | | | 213/62 R |
| 6,637,133 | B2 * | 10/2003 | Theurer | E01B 27/105 |
| | | | | 104/7.1 |
| 6,892,648 | B2 | 5/2005 | Theurer et al. | |
| 7,192,238 | B2 * | 3/2007 | Theurer | B61D 7/32 |
| | | | | 104/2 |
| 9,346,473 | B1 * | 5/2016 | Herzog | B61D 7/02 |
| 2012/0222579 | A1 | 9/2012 | Turner et al. | |
| 2013/0228091 | A1 * | 9/2013 | Theurer | E01B 27/105 |
| | | | | 104/7.1 |
| 2014/0027133 | A1 * | 1/2014 | Theurer | E01B 27/10 |
| | | | | 171/16 |
| 2014/0190045 | A1 * | 7/2014 | Theurer | E01B 27/04 |
| | | | | 37/352 |
| 2017/0009403 | A1 * | 1/2017 | Woergoetter | B65G 67/10 |

FOREIGN PATENT DOCUMENTS

| | | |
|---|---|---|
| DE | 28 53 099 C2 | 12/1985 |
| DE | 37 06 693 A1 | 11/1987 |
| DE | 10 2007 026 310 B3 | 8/2008 |
| EP | 1 083 262 A2 | 3/2001 |
| EP | 1 384 814 A2 | 1/2004 |
| EP | 2 500 470 A2 | 9/2012 |
| EP | 2 708 647 A2 | 3/2014 |

* cited by examiner

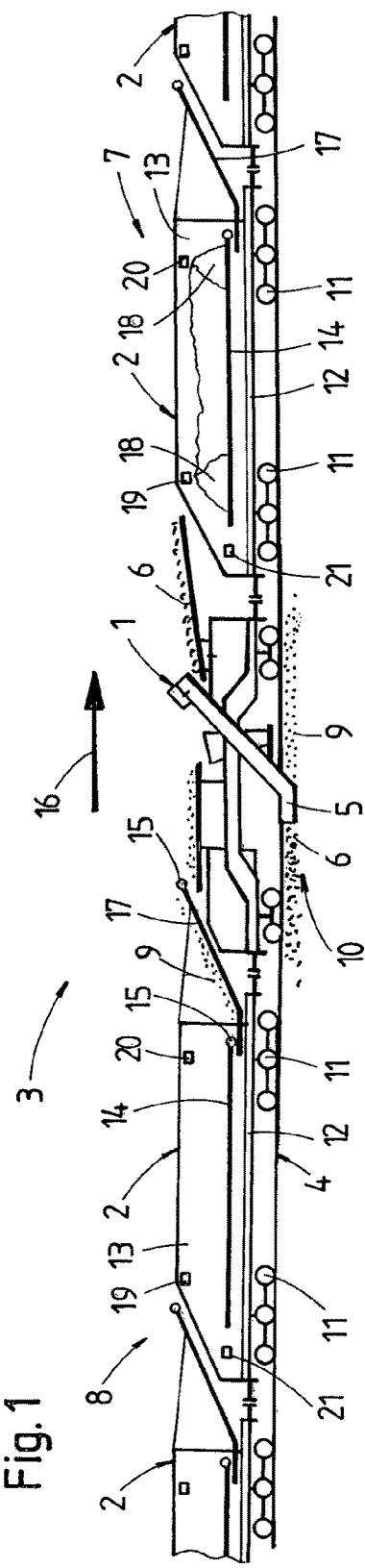
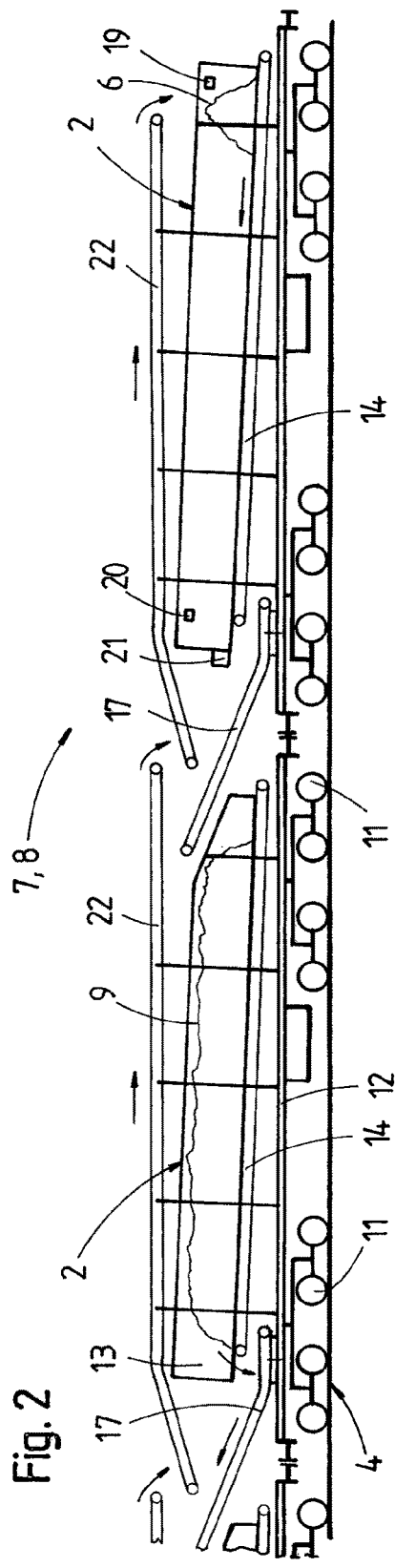

METHOD FOR CONTROLLING THE BALLAST SUPPLY DURING RENOVATION OF A BALLAST BED

CROSS REFERENCE TO RELATED APPLICATIONS

This application is the National Stage of PCT/EP2015/000418 filed on Feb. 24, 2015, which claims priority under 35 U.S.C. § 119 of Austrian Application No. A 211/2014 filed on Mar. 25, 2014, the disclosures of which are incorporated by reference. The international application under PCT article 21(2) was not published in English.

The invention relates to a method of rehabilitating a ballast bed of a track, wherein old bulk material to be removed—in creating a track construction site—is stored on a plurality of storage wagons connected to form a loading train, while parallel thereto new bulk material pre-deposited on a plurality of storage wagons connected to form a loading train is introduced into the track construction site.

According to U.S. Pat. No. 7,192,238, it is known to connect an arbitrary number of storage wagons to form a loading train. As each storage wagon has both a bottom conveyor belt as well as a transfer conveyor belt, bulk material can be either transported through the loading train or stored on one of the storage wagons, as desired. Sensor devices are provided for the purpose of achieving a maximum charge.

It is the object of the present invention to provide a method of the type mentioned at the beginning with which an improved construction site management is possible.

According to the invention, this object is achieved with a method of the specified kind in that the introduction of the new bulk material into the track construction site is controlled automatically in dependence on a volume of the old bulk material removed from the track construction site.

This automatic compensation of bulk material to be renewed is suited especially for large construction sites, in order to be able to carry out without problems, for example, a complete renewal of a ballast bed with correspondingly large quantities of bulk material.

Additional advantages of the invention become apparent from the dependent claims and the drawing description.

The invention will be described in more detail below with reference to embodiments represented in the drawing in which FIG. 1 shows a side view of an excavating machine connected to two loading trains, and FIG. 2 shows a variant of a loading train.

Shown in FIG. 1 is a machine assembly 3, composed essentially of an excavating machine 1 and several storage wagons 2, for renewal of a ballast bed of a track 4. The excavating machine 1 has a clearing chain 5 for picking up old ballast or bulk material 6 to be removed from a track construction site 10, said bulk material being transported and stored in a plurality of storage wagons 2 coupled to form a first loading train 7. Parallel thereto, new bulk material 9—in the shape of new ballast, in the illustrated case—which has been pre-deposited in structurally identical storage wagons 2 in a second loading train 8 is introduced into the track construction site 10.

The storage wagons 2 essentially consist in each case of a wagon frame 12—mobile on the track 4 via two on-track undercarriages 11—and a storage container 13 connected to the former. A bottom conveyor belt 14 extending in the longitudinal direction of the wagon forms a bottom surface of the storage container 13 and has a drive 15 for actuation in a transport direction 16. Provided at the front end—with regard to said transport direction 16—of each storage container 13 is a transfer conveyor belt 17 which is mounted on the wagon frame 12 underneath a discharge end of the bottom conveyor belt 14, adjoining the same. The transfer conveyor belt 17 is designed sloping upward at an angle and projecting beyond a forward end of the wagon and is equipped with a drive 15.

In a loading train 7, 8, the bottom—and transfer conveyor belts 14, 17—overlapping one another at the ends—of the individual wagons form a continuous conveyor belt road, wherein the bulk material 6 or 9 is passed on in each case from a discharge end of a transfer conveyor belt 17 to the bottom conveyor belt 14 of the storage wagon 2 preceding it in the transport direction 16. If the transporting speed of the conveyor belts 14, 17 is higher, the bulk material 6 or 9 is merely transported through the storage containers 13 in the longitudinal direction of the respective loading train 7, 8 in a so-called end-to-end conveying operation.

However, if the drive 15 of a bottom conveyor belt 14 is switched to slow transporting speed, then this results in the formation of a dump cone 18 and correspondingly in storage of the bulk material 6 in this storage container 13 in the course of a so-called storage operation.

Provided in the rearward end of the storage container 13—with regard to the transport direction 16—is a sensor device 19 serving for continuous detection of the filling state of the storage wagon 2. The sensor device 19 is designed as a contact-less acting laser distance measuring device which continuously scans the dump cone 18 formed by the discharged old bulk material 6 and in the process detects the loading height in the storage container 13.

Provided in the front end—with regard to the transport direction 16—of the storage container 5 is a second sensor device 20. This registers the arrival of the first dump cone 18 and thus the complete filling of the storage container 13. As a consequence, the speed of the associated bottom conveyor belt 14 is reduced to zero, and the storage operation is continued in the adjoining storage wagon 2, if present.

Parallel to the storage of the old bulk material 6, new bulk material 9 pre-deposited in the second loading train 8 is supplied to the track construction site 10 in order to replace the removed bulk material 6. During this, the introduction of the new bulk material 9 into the track construction site 10 is controlled automatically in dependence on a volume of the old bulk material 6 removed from the track construction site 10.

To that end, parallel to calculating the volume of the old bulk material 6 to be removed, a volume of the new bulk material 9 to be supplied is determined also. The calculation of the volumes can be carried out in each case by a contact-less two-dimensional scanning of the bulk material 6, 9 with the aid of the scanning devices 19, 20 in the respective storage wagon 2 in connection with a transporting speed of the bottom conveyor belt 14 provided for the bulk material transport in each storage wagon 2. For this purpose, a control device 21 is provided.

As a rule, the volume of the bulk material to be removed—for example in the shape of spoil accruing during ballast cleaning—varies a great deal. In this respect, a supply of new bulk material—here in the shape of new ballast—which correlates to these varying bulk material quantities is particularly advantageous.

For volume compensation, as an alternative to the above-described scanning of the dump cone, it would also be possible to automatically control the speed of the bottom conveyor belt 14 of the storage wagon 2, transporting the new bulk material 9 to the track construction site 10, in dependence on a speed v of the bottom conveyor belt 14 receiving the old bulk material 6 for storage. However, a prerequisite for this would be a uniform filling of all the storage wagons 2.

Visible in FIG. 2 as an alternative is a loading train 7 or 8 composed of special storage wagons 2 and known from EP 1 083 262. In this case, the old bulk material 6 is transported on conveyor belts 22 to the storage wagon 2 farthest removed from the track construction site 10, and is stored therein. Said storage wagon was previously still filled with new bulk material 9 which is transported via the bottom— and transfer conveyor belts 14, 17 to the track construction site 10 in parallel with the old bulk material 6. In this case also, the above-described automatic volume compensation is possible.

A further variant for an automatic bulk material compensation is possible inasmuch as the measuring of the volumes is carried out directly on the excavating machine 1 by means of suitable scanning devices.

The invention claimed is:

1. A method of rehabilitating a ballast bed of a track, comprising the steps of:

removing old bulk material in creating a track construction site;

storing the bulk material on a plurality of storage wagons connected to form a loading train;

depositing new bulk material on a plurality of storage wagons connected to form a loading train;

introducing new bulk material into the track construction site, wherein the introduction of the new bulk material into the track construction site is controlled automatically in dependence on a volume of the old bulk material removed from the track construction site;

determining a volume of new bulk material to be supplied-parallel to calculating the volume of the old bulk material to be removed;

wherein the calculation of the volumes is carried out in each case by means of a contact-less two-dimensional scanning of the bulk material in the respective storage wagon in connection with a transporting speed of a bottom conveyor belt provided for the bulk material transport in each storage wagon.

2. The method according to claim 1, further comprising the step of automatically controlling a speed of the bottom conveyor belt of the storage wagon transporting the new bulk material to the track construction site is in dependence on a speed of the bottom conveyor belt receiving the old bulk material for storage.

* * * * *